No. 615,113. Patented Nov. 29, 1898.
L. W. STOCKBRIDGE & F. C. ROLLINS.
MACHINIST'S CLAMP.
(Application filed Apr. 27, 1898.)
(No Model.)
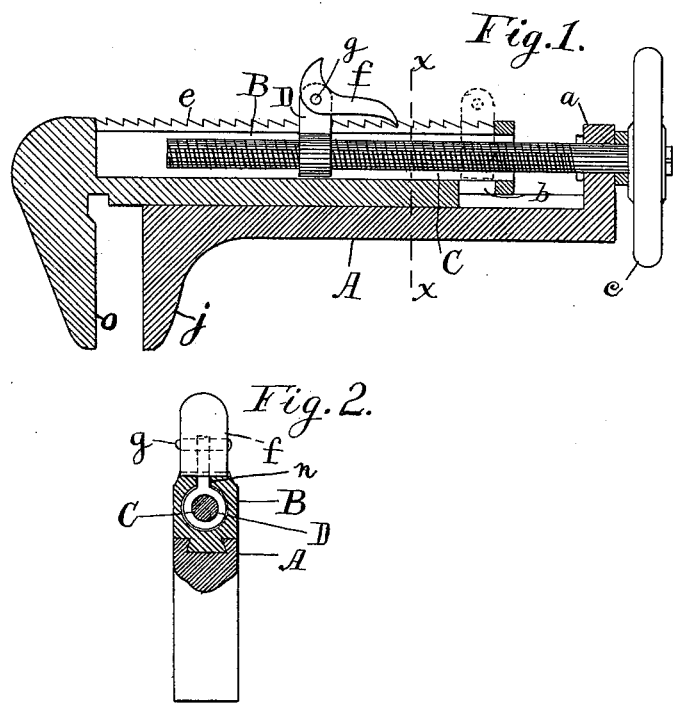

UNITED STATES PATENT OFFICE.

LEON W. STOCKBRIDGE, OF PORTLAND, AND FRANK C. ROLLINS, OF FARMINGTON, MAINE; SAID ROLLINS ASSIGNOR TO ALDEN M. PETTENGILL, OF PORTLAND, MAINE.

MACHINIST'S CLAMP.

SPECIFICATION forming part of Letters Patent No. 615,113, dated November 29, 1898.

Application filed April 27, 1898. Serial No. 678,940. (No model.)

*To all whom it may concern:*

Be it known that we, LEON W. STOCKBRIDGE, a resident of Portland, Cumberland county, and FRANK C. ROLLINS, a resident of West Farmington, Franklin county, State of Maine, citizens of the United States, have invented certain new and useful Improvements in Machinists' Clamps, of which the following is a specification.

Our invention relates particularly to a machinist's clamp; but it is equally adapted to be used on a vise or a wrench or for other similar purposes.

The object of our invention is to construct a clamp which may be quickly set and adjusted and which shall have a strong and simple construction capable of being easily taken apart and put together, so that the parts may be replaced with ease.

We illustrate our invention by means of the accompanying drawings, in which—

Figure 1 is a longitudinal section, and Fig. 2 is a cross-section on the line $x$ $x$ of Fig. 1.

The clamp has two bars A and B, dovetailed together or otherwise secured so that they have longitudinal motion one with relation to the other.

The bar A, which for convenience we call the "fixed" bar, has at one end a jaw $j$ and at the other end a projection or offset $a$, within which is journaled the screw-threaded spindle C. The spindle C extends into the hollow sliding bar B, which bar is provided with a jaw $o$, opposed to the jaw $j$, and a longitudinal slot $n$, connected with the hollow interior of the bar.

Within the bar B is a nut D, which is adapted to slide from end to end of the bar, and the nut has an extension which projects out through the slot $n$. The nut D engages the spindle C and is moved along within the bar by the turning of the spindle.

Adjacent to the edges of the slot $n$ and on the outside of the bar there is a rack $e$, and a pawl $f$, pivoted by means of a pin $g$ to the extension of the nut D, is adapted to engage said rack. The pawl is so shaped that it can be readily connected and disconnected by the thumb.

A hand-wheel $c$ or other suitable handle is provided to turn the spindle.

When the pawl is disengaged, the sliding bar B can be readily slipped in or out and adjusted approximately on the work to be clamped, and then when the pawl is allowed to engage the teeth of the rack the spindle is turned, moving the nut away from the jaws and carrying with it the sliding bar B. By the purchase thus obtained the jaws may be then firmly set on the work.

It is evident that the construction embodied here can be used in a wrench, vise, or other similar tool.

The clamp may be taken apart by removing the pin $g$ and taking off the pawl, after which the screw may be withdrawn from the nut and the latter slipped along to the end of the slide, as shown by dotted lines in Fig. 1. It is then passed down through the opening $b$, provided for the purpose.

The jaws may be provided with corrugated surfaces for the purpose of forming a pipe-wrench or vise, if desired.

We claim—

The herein-described machinist's clamp consisting of a fixed bar and a hollow sliding bar held together by suitable guides so that they have a longitudinal motion, one with relation to the other, each bar having on adjacent ends a jaw, said sliding bar having a longitudinal slot and a rack adjacent thereto on the outside of the bar, a screw-threaded spindle journaled at one end of said fixed bar and extending into the said hollow sliding bar, a nut adapted to engage said spindle and having an extension projecting through said slot and carrying a pawl and its operating means, said pawl being adapted to engage said rack, whereby said pawl, its operating means and said nut are adjustable along said screw.

LEON W. STOCKBRIDGE.
FRANK C. ROLLINS.

Witnesses to the signature of Leon W. Stockbridge:
    AUGUSTA V. SWEETSER,
    W. E. WHIPPLE.

Witnesses to the signature of Frank C. Rollins:
    E. H. RANGER,
    J. P. SWETT.